United States Patent
Garvey, III et al.

(10) Patent No.: US 7,561,200 B2
(45) Date of Patent: Jul. 14, 2009

(54) APPARATUS AND METHOD FOR AUTOMATION OF IMAGING AND DYNAMIC SIGNAL ANALYSES

(75) Inventors: Raymond E. Garvey, III, Loudon, TN (US); Michael D. Rich, Powell, TN (US); Anthony J. Hayzen, Knoxville, TN (US); Mark Granger, Knoxville, TN (US)

(73) Assignee: CSI Technology, Inc., Wilmington, DE (US)

( * ) Notice: Subject to any disclaimer, the term of this patent is extended or adjusted under 35 U.S.C. 154(b) by 583 days.

(21) Appl. No.: 10/899,511

(22) Filed: Jul. 26, 2004

(65) Prior Publication Data

US 2006/0017821 A1    Jan. 26, 2006

(51) Int. Cl.
*H04N 5/222* (2006.01)
*G01N 24/00* (2006.01)
*G01H 17/00* (2006.01)
*G06F 11/30* (2006.01)
*G21C 17/00* (2006.01)

(52) U.S. Cl. .................. 348/333.01; 702/184; 73/570

(58) Field of Classification Search .............. 73/592; 702/33, 184; 348/333.01
See application file for complete search history.

(56) References Cited

U.S. PATENT DOCUMENTS

| | | | | |
|---|---|---|---|---|
| 5,133,605 A | * | 7/1992 | Nakamura | .............. 374/124 |
| 5,386,117 A | * | 1/1995 | Piety et al. | .............. 250/330 |
| 5,637,871 A | | 6/1997 | Piety et al. | |
| 5,680,025 A | * | 10/1997 | Bowers et al. | .............. 318/806 |
| 5,710,723 A | | 1/1998 | Hoth et al. | |
| 5,822,450 A | * | 10/1998 | Arakawa et al. | .............. 382/152 |
| 5,910,816 A | | 6/1999 | Fontenot et al. | |
| 5,956,658 A | * | 9/1999 | McMahon | .............. 702/83 |
| 6,192,325 B1 | | 2/2001 | Piety et al. | |
| 6,298,454 B1 | * | 10/2001 | Schleiss et al. | .............. 714/37 |

(Continued)

FOREIGN PATENT DOCUMENTS

GB    2 346 720    8/2000

OTHER PUBLICATIONS

US Infrared Incorporated, Thermoviewer, "A Maintenance System for the 21st Century", (2 pp.).

(Continued)

*Primary Examiner*—David L Ometz
*Assistant Examiner*—Kelly L Jerabek
(74) *Attorney, Agent, or Firm*—Luedeka, Neely & Graham, P.C.

(57) ABSTRACT

A method and apparatus for inspecting equipment using focal plane array imaging sensor data and dynamic sensor data. Methods involve capturing focal plane array imaging sensor data using a focal plane array imaging sensor such as an infrared camera or a visible camera, or acquiring imaging sensor data from an electronic data storage source, and involve capturing dynamic sensor data, such as vibration or ultrasonic data using a dynamic sensor such as an accelerometer or ultrasound system. Methods also provide for analyzing imaging and dynamic sensor data using such techniques as thermography and fast fourier transformation. Apparatuses include a portable instrument with sensor interfaces for collecting imaging sensor data and dynamic sensor data. A sensor suite is provided that includes vibration sensor, sonic sensors, ultrasonic sensors, oil sensors, flux sensors and current sensors. A base station is included to collect and analyze data from one or more portable instruments.

22 Claims, 7 Drawing Sheets

U.S. PATENT DOCUMENTS

| | | |
|---|---|---|
| 6,548,811 B1 * | 4/2003 | Nakamura et al. .......... 250/311 |
| 6,594,621 B1 * | 7/2003 | Meeker ...................... 702/185 |
| 6,606,115 B1 * | 8/2003 | Alicandro et al. .......... 348/164 |
| 6,810,406 B2 * | 10/2004 | Schlabach et al. .......... 707/201 |
| 6,839,660 B2 | 1/2005 | Eryurek et al. |
| 7,010,445 B2 | 3/2006 | Battenberg et al. |
| 7,027,959 B2 * | 4/2006 | Hayzen et al. .............. 702/188 |
| 7,085,684 B2 * | 8/2006 | Yoshie et al. ............... 702/188 |
| 7,088,255 B2 * | 8/2006 | Ridolfo et al. ............. 340/635 |
| 7,167,814 B2 * | 1/2007 | Lindberg et al. ............ 702/185 |
| 7,305,326 B2 * | 12/2007 | Hayzen et al. .............. 702/185 |
| 7,454,050 B2 * | 11/2008 | Garvey ....................... 382/141 |
| 2003/0028268 A1 | 2/2003 | Eryurek et al. |
| 2003/0061008 A1 * | 3/2003 | Smith et al. ................. 702/188 |
| 2004/0021773 A1 * | 2/2004 | Hayakawa ................. 348/164 |

OTHER PUBLICATIONS

Tracking Analyzer Balancer System, DI-137, Dynamic Instruments, San Diego, CA, www.dynamicinst.com (2 pages).

WT Blademaster, Swangate International, www.swangate.com (1 page).

Delivering Machine Intelligence, "DLI Watchman® DCX™ Hammerhead, Portable Vibration Data Collector & Machine Diagnostic Analyzer", © 2003—DLI Engineering Corporation, www.dliengineering.com.

Walkabout, www.walkabout-comp.com/products_specs_port.html, Jul. 12, 2004.

* cited by examiner

US 7,561,200 B2

APPARATUS AND METHOD FOR AUTOMATION OF IMAGING AND DYNAMIC SIGNAL ANALYSES

FIELD

This invention pertains to an apparatus for detecting and analyzing equipment operational parameters. More particularly the invention pertains to apparatuses for imaging and dynamic signal analysis for monitoring the status of equipment health. Imaging devices include focal plane array devices that sense infrared or visible light. Dynamic signal analysis devices include vibration or ultrasonic detectors.

BACKGROUND

Infrared imagers are commonly used for thermographic inspections of equipment. State of the art for infrared inspection process involves use of an uncooled, radiometric, focal plane array, infrared camera plus visible camera built into a lightweight, hand-held package with onboard digital memory, an LCD display, and interactive user interface. Visible light imaging systems are also used for inspection of equipment. Examples of such applications are borescopes, fiberscopes, and even conventional video cameras.

Various dynamic measurement systems have also been developed to monitor the operational health of equipment. Examples of such systems are vibration analysis devices, sonic or ultrasonic measurement devices, and electromagnetic spectrum analyzers In addition, various devices have been developed for measurement of conditions that are often more static in nature, such as temperature, pressure, and lubrication properties.

Typically, vibration analysis and infrared analysis have been handled as distinct and separate condition monitoring techniques with regard to walk-around inspections, routes, or surveys. The maintenance departments of industrial plants have employed totally separate devices for each different condition monitoring method. For example a typical industrial plant often uses an infrared camera for infrared inspection, a multi-frequency sonic and ultrasonic inspection system for acoustic monitoring, a videoscope for video inspection, a minilab oil analyzer for on-site oil analysis, and a fast Fourier transform (FFT) equipment analyzer for vibration, flux, and current analysis.

Existing technology does not adequately address all of the needs for integrating the collection of imaging information with other sensor measurements. What is needed is a system that provides portable imaging capability with portable dynamic sensor measurement capability plus optionally portable static measurement capability.

SUMMARY

With regard to the above, in one of its embodiments the invention provides a portable instrument for inspecting equipment. The portable instrument includes a first sensor interface for a focal plane array imaging sensor, where the first sensor interface includes electro-mechanics configured to receive imaging sensor data. The portable instrument also includes a second sensor interface for a dynamic sensor, where the second sensor interface includes electro-mechanics configured to receive dynamic sensor data. Further, the portable instrument incorporates a digital memory that stores an operating system and application instructions and a dataset. A processor is proved that runs the operating system and is operatively connected to the digital memory and operatively connected to the first sensor interface and is operatively connected to the second sensor interface. The processor is configured to use at least a portion of the application instructions for recording in the dataset at least a portion of imaging sensor data and for recording in the dataset at least a portion of dynamic sensor data. The processor is further configured to use at least a portion of the application instructions to operate on the imaging sensor data and to derive at least one dynamic indication of equipment health. Additionally, the portable instrument has a display that presents information; and a user interface that in cooperation with the processor controls what information is presented on the display.

Alternate embodiment provides a portable apparatus for inspecting equipment that includes a first sensor interface for a focal plane array imaging sensor, where the first sensor interface includes electro-mechanics configured to receive imaging sensor data, and a second sensor interface for a dynamic sensor, where the second sensor includes electro-mechanics configured to receive dynamic sensor data. The portable apparatus also incorporates a processor operatively connected to the first sensor interface and operatively connected to the second sensor interface and configured with an application instruction for analyzing the dynamic sensor data and for deriving at least one dynamic indication of equipment health, and a display that presents information, and a user interface that in cooperation with the processor controls what information is presented on the display. The portable apparatus also incorporates a focal plane array imaging sensor that is operatively connected to the first sensor interface for sending imaging sensor data to the first sensor interface, and a dynamic sensor that is operatively connected to the second sensor interface for sending dynamic data to the second sensor interface.

A further alternate embodiment is an apparatus for inspecting equipment that includes a portable instrument and a base station. The portable instrument incorporates a first sensor interface for a focal plane array imaging sensor, where the first sensor interface includes electro-mechanics configured to receive imaging sensor data, and a second sensor interface for a dynamic sensor, where the second sensor includes electro-mechanics configured to receive dynamic sensor data. The portable instrument also incorporates a processor operatively connected to the first sensor interface and operatively connected to the second sensor interface, plus a display that presents information, a user interface that in cooperation with the processor controls what information is presented on the display, and a wireless transmitter that is configured cooperatively with the processor to transmit at least a portion of the imaging sensor data and at least a portion of the dynamic sensor data. The a base station has a wireless receiver configured to receive at least a portion of imaging sensor data and at least a portion of dynamic sensor data transmitted by the transmitter in the portable instrument. The base station also includes a central processor that is operatively connected to the receiver, a station display that presents information, and a station user interface that in cooperation with the central processor controls what information is presented on the station display.

A different embodiment presents a method for inspecting equipment that involves storing in an instrument (a) application instructions for receiving, storing and analyzing focal plane array imaging sensor data to derive at least one imagery indication of equipment health, and (b) application instructions for receiving, storing, and analyzing dynamic sensor data to derive at least one dynamic indication of equipment health, and (c) application instructions for correlating at least one imagery indication of equipment health with at least one dynamic indication of equipment health. The method continues with receiving and storing focal plane array imaging sensor data and dynamic sensor data in the instrument using at least a portion of the application instructions, deriving at least one imagery indication of equipment health using at least a portion of the application instructions, and deriving at least one dynamic indication of equipment health using at least a portion of the application instructions. The method concludes with the step of correlating at least one imagery indication of equipment health with at least one dynamic indication of equipment health.

A further alternate method embodiment is a method for inspecting equipment that includes storing in an instrument application instructions for capturing and transmitting imaging sensor data from a focal plane array imaging sensor and application instructions for capturing and transmitting waveforms from a dynamic sensor, and storing in a base station application software for (a) receiving, storing and analyzing imaging sensor data to derive at least one imagery indication of equipment health, and (b) application software for receiving, storing, and analyzing waveforms to derive at least one dynamic indication of equipment health, and (c) application software for correlating at least one imagery indication of equipment health with at least one dynamic indication of equipment health. The method includes a step of capturing imaging sensor data with a focal plane array imaging sensor and transmitting at least a portion of the imaging sensor data from the instrument to the base station using at least a portion of the application software. A further step is receiving and storing in the base station at least a portion of the imaging sensor data transmitted by the instrument using at least a portion of the application software. The method includes capturing dynamic sensor data with a dynamic sensor and transmitting at least a portion of the dynamic sensor data from the instrument to a base station using at least a portion of the application software, with the further step of receiving and storing in the base station at least a portion of the dynamic sensor data transmitted by the instrument using at least a portion of the application software. The method concludes with deriving at least one imagery indication of equipment health using at least a portion of the application software, and deriving at least one dynamic indication of equipment health using at least a portion of the application software.

An alternative embodiment provides a system for inspecting equipment. the system incorporates a portable instrument that includes a focal plane array imaging sensor selected from selected from the group consisting of (a) an infrared focal plane array imaging sensor and (b) a visible focal plane array imaging, where the focal plane array imaging sensor is configured to generate imaging sensor data and a dynamic sensor selected from the group consisting of (a) a vibration sensor and (b) a sonic sensor and (c) an ultrasonic sensor and (d) a flux sensor and (e) a current sensor, where the dynamic sensor configured to generate dynamic sensor data. The portable instrument further includes digital memory that stores an operating system and application instructions and a dataset. The portable instrument has a processor that runs the operating system and is operatively connected to the digital memory and operatively connected to the imaging sensor and is operatively connected to dynamic sensor. The processor is configured to use at least a portion of the application instructions for recording in the dataset at least a portion of the imaging sensor data and for recording in the dataset at least a portion of the dynamic sensor data. The processor is further configured to use at least a portion of the application instructions to operate on the imaging sensor data and the dynamic sensor data stored in the dataset and to derive at least one dynamic indication of equipment health. the portable instrument also includes a display that presents at least a portion of the imaging sensor data and presents at least a portion of the dynamic sensor data. The portable instrument also has a user interface that in cooperation with the processor controls what imaging sensor data and what dynamic sensor data is presented on the display.

A further alternative embodiment provides a method for automating inspection of an equipment item using both imaging and dynamic signal analysis. The method begins with providing a battery-operated inspection device having a processor, memory, a display having at least one window data input, and a user interface. The method proceeds with providing imaging data and dynamic signal data for the equipment item to the processor. The method also includes steps of using the processor to derive a dynamic indication of equipment health based upon a least a portion of the inputted dynamic signal data and using the processor to establish an association data element. the method also includes a step of providing a user interface selection to allow a user to view at least a portion of the imaging data and at least a portion of the dynamic indication of equipment health on at least one window on the display while the user performs the inspection.

One advantage of these and other embodiments is the improved ability to analyze the health of equipment. Incorporation of means to gather data in the field is also important in some embodiments. Other advantages of various embodiments include integrating the functions of a portable instrument with a base station. Also, as will be seen in the detailed description of various embodiments, provisions for analyzing imaging sensor data and dynamic sensor data are incorporated to meet previously identified needs. Finally, embodiments are provided that incorporate combined analysis of imaging sensor data and dynamic sensor data thereby enhancing the overall versatility and utility of various embodiments for maintenance and preventive maintenance operations.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
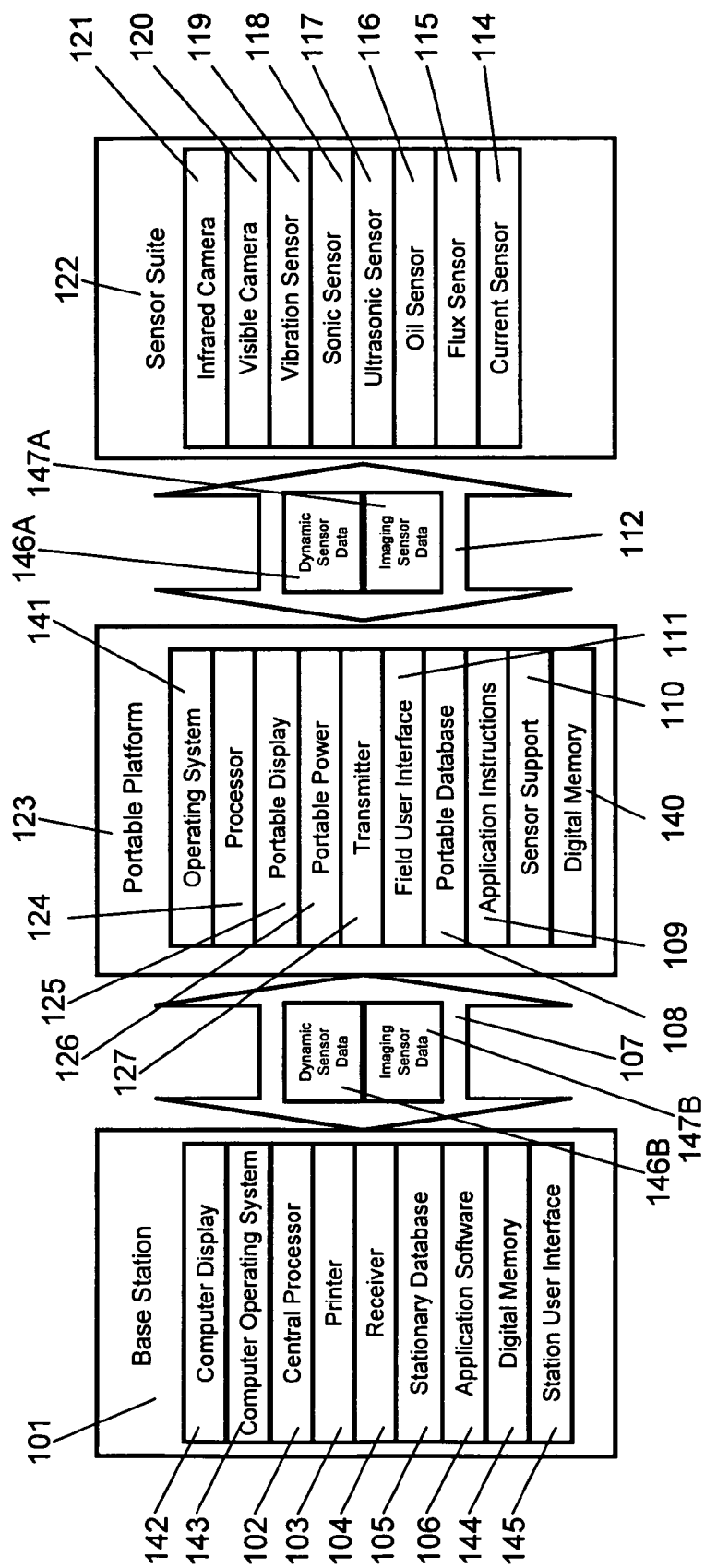
FIG. 1 is a block diagram of a multiple sensor system.

The present invention provides an apparatus for efficiently identifying and analyzing concerns possibly requiring maintenance for various types of equipment and machinery such as power circuits, transformers, switchgear, motor control centers, motors, pumps, fans, presses, drive trains, gear boxes, etc. The term "equipment" will be used and understood herein to include machinery and to cover devices with moving part as well as devices without moving parts. Many embodiments described herein allow for complex analysis, including summation, of multiple signals representing equipment characteristics through a plurality of sensors, and provides the opportunity for economy, time savings and safety through operation of a portable platform connected by contact or wireless means to a both dynamic signal analysis and focal plane array imaging sensors. A portable platform is a form of an instrument.

The preferred embodiments employ a multiple-technology, highly automated, portable inspection system that combines infrared inspection with other portable condition monitoring technologies.

One aspect of the most preferred embodiments is a portable platform that the technician carries to the field. The portable platform typically includes a processor with software constructed in a housing. The portable platform generally also includes portable display, portable power system, and data input and data output capability. It has mouse or touch-screen or button or other user interface capabilities for use by the field technician.

Another aspect of the most preferred embodiments of the portable platform is the incorporation of at least one sensor interface in the portable platform. A sensor interface typically comprises electro-mechanics (hardware, firmware, or both) that are capable of receiving data from a sensor and conveying the data to central processing unit in portable platform so that the data may be stored in electronic memory. In some embodiments, the sensor interface also includes electro-mechanics for transmitting data from the portable platform to the sensor. A sensor interface may also incorporate electronics and firmware tools for translating signals from a sensor into useful data. For example, a sensor interface may include an analog to digital converter, a sampling circuit or sampling software, a frame grabber, or a format conversion tool such as hardware or software for converting NTSC or PAL video signals to VGA or SVGA format for presentation on a display, or for converting such signals to .jpg (or similar) files for storage in an electronic memory. A sensor interface may also include data authentication tools such as time stamping, encryption, and file locking software, although such data authentication tools may alternately be provided by application instructions that reside in the electronic memory and are executed by the portable platform. Some examples of a sensor interface are a video capture card, an RS-232 serial port module, a parallel port, a universal serial bus (USB) card, an analog interface adapter, an input/output card, and a data acquisition board. In the most preferred embodiments, the sensor interface is operatively connected to the housing of the portable platform, meaning that is mechanically mounted and electronically integrated with the other electronics.

Generally, sensor interfaces are designed to accommodate dynamic sensor data. Dynamic sensor data represents information having a time domain, meaning that the measurements detected by the sensor vary over time and that variation is recorded from a start time to an end time. However, sensor interfaces are often also designed to accommodate static sensor data. Static sensor data represents measurements taken at a single point in time.

Imaging techniques can include either infrared or visible detection sensors having either analog or digital output. Infrared cameras are often used as infrared imaging sensors and digital cameras are often used as visible imaging sensors. In both cases the field of view for the image describes an area of interest. Infrared imaging includes both radiometric and non-radiometric type detector arrays. Imaging may be individual frame or multiple frames. Imaging may include enhancements by magnification, zoom, light amplification, or optical wave guides, or other techniques. These images produced by such imaging sensors are examples of imaging sensor data.

Typically image data analysis produces an array of values such as emissivity or temperature or another imagery indication of equipment health. Other imagery indications of equipment health may include the following.

Point value representation normally associated with either the center pixel or a cursor.

Maximum scalar value determination.

Minimum scalar value determination.

Average scalar value determination.

Median scalar value determination.

Absolute or standard deviation scalar value representing a range of values.

Delta scalar value or differential determination.

Contour of scalar values or connection of pixels having similar values.

Alarm limit scalar values methods for distinguishing values inside or outside of alarm conditions.

Histogram showing statistical profile representation of scalar values within a selected area.

Line profile showing scalar values corresponding to a linear path on the image

Other individual, differential, or statistical analysis of scalar values with or without considering pixel position.

Distance in pixels or other dimensional units between features on the image.

Number(s) of item(s) with particular characteristics on at least a portion of the image.

Classification of characteristics of object(s) in the image based on particular visual characteristics.

Comparison of image being analyzed with one or more reference imaging sensor data.

Results of parametric analysis of the image using a digital image analysis software tool.

Results of parametric analysis using other graphical image analysis tools.

Dynamic sensors typically employ devices such as accelerometers, piezoelectric components, electrical current or voltage probes, thermocouples, pitot tubes, and sonic or ultrasonic detectors. Dynamic analysis or dynamic signal analysis techniques include, but are not limited to Fast Fourier Transform (FFT) vibration analysis, waveform vibration analysis, spectral vibration analysis, stress wave analysis, transient analysis, sonic analysis, ultrasonic analysis, FFT flux analysis, and FFT current analysis. Such analysis generally produces one or more dynamic indications of equipment health. Examples of dynamic indications of equipment health are:

Speed

Overall value

Less than one times turning speed value

One times turning speed value

Two times turning speed value

Three to eight times turning speed value

Nine to thirty-five times turning speed value

More than thirty-five times turning speed value

One times line frequency value

Two times line frequency value 4 kHz peak value 4 kHz average value 4 kHz peak hold value 30 kHz peak value 30 kHz average value 30 kHz peak hold value 40 kHz peak value 40 kHz average value 40 kHz peak hold value 150 kHz peak value 150 kHz average value 150 kHz peak hold value The dynamic indications of equipment health are often associated with particular locations or orientations. Here are some examples of such particular locations or orientations:

- Motor outboard horizontal
- Motor outboard vertical
- Motor outboard axial
- Motor inboard horizontal
- Motor inboard vertical
- Pump inboard horizontal
- Pump outboard horizontal
- Pump outboard axial
- Inlet
- Outlet
- Suction
- Discharge
- X, Y, Z or other coordinate locator
- Angle or other relative orientation Many preferred embodiments provide for the correlating of imaging analysis data and dynamic or static data analysis data. In a very basic form, the correlating is accomplished by simply making both imaging sensor data and dynamic or static data available substantially simultaneously to a technician so that results can be reviewed comparatively. Correlating data may also involve such actions as adjusting scales to common units, identifying data sets that pertain to the same equipment or measurements, matching imaging sensor data files with dynamic sensor data files, and performing multivariate analysis. In some instances this correlating includes the calculation of one or more equipment health combined statistics that are derived from a joint analysis of imaging sensor data and dynamic/static data. Examples of equipment health combined statistics are:

- Temperature of an excessively vibrating bearing.
- Overlay of a thermal trend and a vibration level trend.
- Viscosity of oil at the highest temperature point in a machine.
- A plot of peak vibration versus temperature.
- Amperage at hottest spot in a power line.
- Comparison of a thermal image and an ultrasonic image.
- Dimensional location of hottest point in a furnace.
- Thermographic image data and corresponding ultrasonic dB values for inlet and outlet positions on a steam trap or other valve.
- Infrared image showing fluid level, compared to level sensor output showing same fluid level.
- Infrared image showing relatively hot coupling verifying vibration analysis results indicating misalignment.
- Visual image showing adhesive wear indications from mixed mode or boundary lubrication compared to elevated ultrasonic dB levels.
- Delta-temperature correlated with heterodyned ultrasonic sounds from electrical discharge or corona on power line insulator connections.
- Visual strobe imaging synchronized with a vibration fault frequency.
- Bore scope image of gear or bearing components identified by characteristic vibration spectrum.
- Animation of an otherwise static visual image using data from modal vibration analysis.
- Correlation of image and vibration due to misalignment before and after thermal growth.
- Comparison of ultrasonic dB levels with oil level.
- Verification that heat showing up on a thermographic image is caused by increased friction due to adhesive wear (e.g., boundary lubrication regime) by measuring airborne ultrasonic signature in the vicinity of the relatively hot location on the thermogram.
- Comparing data from wear debris image analysis with PeakVue® vibration data.
- Correlation of ultrasonic leak detection with thermographic image for a system containing compressed or heated gas
- Validation of stator faults by comparing thermographic image with motor flux analysis.

In integrating imaging and dynamic sensor data it is beneficial to store to at least one association data element that identifies what imaging sensor data is associated with what sensor data. In most cases this association is the result of taking and recording both the imaging sensor data and the sensor data related to a particular piece of equipment at approximately the same time. However in some cases the association may relate to changes that occur over time, comparative information taken from multiple machines, or other considerations. The association data elements may be established by creating a data field in an independent database that links the identity one or more image files with the identity of one or more sensor data files. In other cases association data elements may be established by creating matching data records in separate file fields in both the image file(s) and the sensor data file(s) that are associated with each other. One image file may be associated with only one sensor data file, or one image file may be associated with multiple sensor data files, or multiple image files may be associated with one sensor data file. It is even possible that multiple image files and multiple sensor data files are all associated. Examples of association data elements are an electronic date and time stamp, a job code identifier, an operator identifier, a location identifier, a subject identifier, or even a random number that ties both the imaging sensor data and the dynamic sensor data together so that the two data sets are identified as being associated with each other.

An example of combining imaging and associated analysis with dynamic analysis in a portable system is the integration of infrared thermography with portable vibration analysis. The infrared focal plane array and vibration transducer are two of the sensors from which the technician collects data while in the field using the portable platform. This combination provides a view of equipment health enabling fault isolation. Certain faults trigger temperature changes, some trigger both temperature and vibration signatures, and some trigger only vibration indications. Examples are motor stator shorts, coupling faults, and imbalance respectively. This method of using multiple techniques to view equipment faults is called fault isolation.

The use of thermographic imaging allows the technician to survey a large area on the machine in a rapid sweep, quickly locating hot or cold sites. Temperature anomalies are easily identified with the focal plane array technique that would likely have been missed using point temperature measurements. Temperature excursions are commonly associated with equipment faults. Embodiments that include portable vibration analysis provide the technician with a further beneficial tool to assess such equipment faults.

Another example of imaging and dynamic analysis is the integration of infrared thermography with sonic or ultrasonic analysis. In this case the infrared focal plane array and sonic or ultrasonic transducers are two of the sensors from which the technician collects data while in the field using the portable platform. The term sonic sensor refers to a sensor that detects transmission media waves at frequencies up to the top of the human audible range, whereas the term ultrasonic sensor refers to a sensor that detects transmission media waves above the top frequency of the human audible range. Both ultrasonic and infrared focal plane array technologies are well suited for area surveys. The combination provides greater insight than use of either one independently. For example, steam traps are best surveyed using both infrared and sonic/ultrasonic measurements. The focal plane array is able to identify steam flow and blow-by. Sonic and ultrasonic sensors are able to identify performance of many mechanisms inside the steam trap. The combination isolates faults and provides intuitive insight as to normal versus abnormal operation. Certain traps are faulty when steam is blowing by. For others this is normal. The visible indication and ultrasonic signature allows the user to fully understand the operation and interpret the normal or fault condition. In the same way, ultrasonic and infrared are excellent combined field technologies for electrical applications in which corona, arcing, or discharge may occur. By understanding that ultrasonic signature often indicates friction and sustained high friction generates temperature excursions, the operator equipped with a single platform including both measurements has the advantage.

Still another aspect of some embodiments is the integration of infrared thermography with oil analysis information collected while on a route or survey. In this case the infrared focal plane array and an oil sensor are two of the sensors from which the technician collects data using the portable platform. Four of the common equipment fault conditions revealed through lubricant analysis include fatigue, abrasion, adhesion, and corrosion. Fault isolation can be enhanced using the combination of infrared focal plane array inspection with lubricant analysis. For example, adhesion often results from inadequate lubrication which may be caused by low viscosity. A viscosity sensor reporting low oil viscosity combined with the presence of heat in load bearing regions provides an indication of cause and effect. The viscosity sensor can be installed in the machine with communication via cable or wireless method, or the viscosity sensor can be transported to the equipment by the operator.

Typically an oil sensor is a static sensor and the measured data are static sensor data. Other examples of sensors that are normally used as static sensors are pressure gages, temperature probes and linear displacement gages.

The combination of three or four data analyses (e.g., oil analysis, sonic/ultrasonic analysis, vibration analysis, and focal plane array infrared analysis) may provide the operator with immediate and accurate indication of equipment health that would not have been derived by one or even two of the separate technologies. For example, in the event that the oil level falls below critical level causing the oil sensor to trigger "low oil" the resulting condition can be a lubricant starved bearing condition with high ultrasonic signature, high vibration as well as a temperature excursion. The operator who observes this situation fills the oil level, noting the return to normal oil level, normal sonic/ultrasonic signature, normal temperature, and vibration signature with distinctly quantified vibration faults and fault frequencies. The combination allows a field operator to make an accurate assessment of the equipment condition and effect of corrective actions.

Yet another aspect of the invention is the integration of infrared thermography with bore-scope inspection while on a route or survey. In this case the infrared focal plane array and the bore-scope are two of the sensors from which the technician collects data using the portable platform. In this case the infrared looks at the outside surface temperature while the bore-scope interrogates the inside aspects of a difficult to access volume containing critical mechanisms.

A bore-scope is one example of a visible image sensor. A visible image sensor is a sensor that detects light in the human visible spectrum. Other examples of visible image sensors are camcorders, optical microscope imagers, and digital cameras.

Typically, the technician will determine which measurements will need to be made and carry only the items needed for a particular survey. Sensors in the sensor suite may be carried by the technician or may already be installed in the field application.

Sensors may be connected by cable to the portable platform. An alternative configuration is for the sensor to be in wireless communication. Another alternative is for the sensor to collect measurements in one operation and then transfer the data to the portable platform in a second operation using electrical contacts or wireless communication. Also a microphone recording device, typically built into the portable platform, may be used to provide voice annotation. A microphone is a specialized form audible detector that is excluded from the general category of sonic sensors.

Many embodiments incorporate a base computer that in preferred embodiments consists of a personal computer with database and application software, data input/output, and a printer. Either the portable platform or the base computer or both can be part of a network or server or internet application.

An aspect of preferred embodiments is a portable platform which may include a processor (such as a central processing unit), display, power supply, transmitter, user interface, database, application instructions (firmware or software), and at least one sensor interface. Often a personal computer is adapted to become the computing portion of a portable platform. In some of these embodiments the portable platform uses cables and electrical contact to transmit data. In an alternate embodiment, communications may be accomplished using wireless means such as infrared or radio frequency or microwave. Such wireless communications may be used between the portable platform and one or more of the sensors. Wireless communications may also be used between the portable platform and the host system. Generally the application instructions loaded in the portable platform direct the functioning of the unit. However in some cases some of the software, database, and other functions may be equivalently performed in the host or base platform instead of on the portable platform by, for example, using networks, file servers, and so forth.

An overarching theme of many embodiments is the ability to operate on imaging sensor data and dynamic or static sensor data. Operating on the data may include such actions as editing the data, reformatting the data, adding annotations to the data, simultaneously viewing image data and sensing data, correlating data from the same sensor, correlating the data from different sensors, or analyzing the data.

Figure 2:
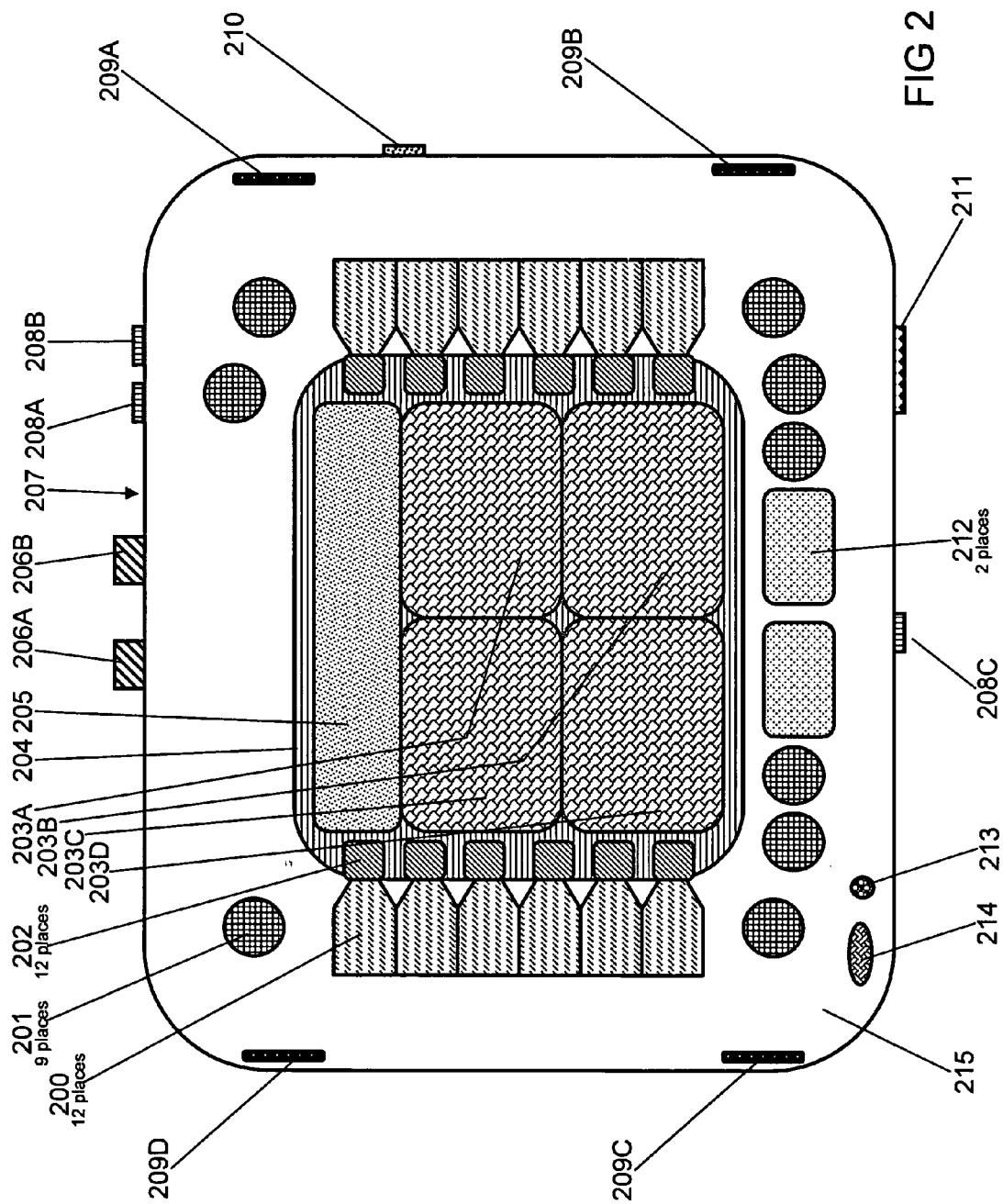
FIG. 2 is a depiction of switchgear in a switchyard.
Figure 3:
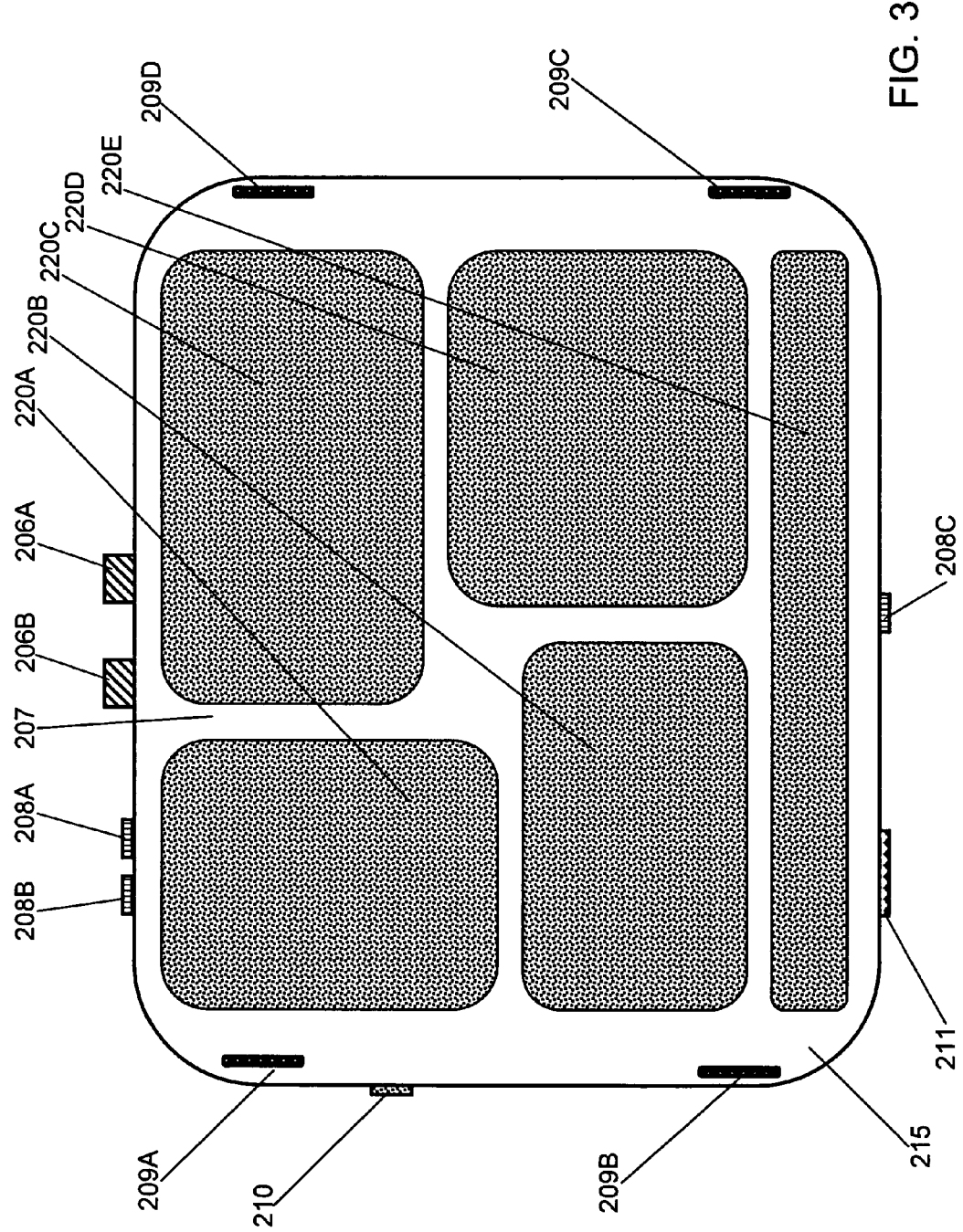
FIG. 3 is a schematic representation of a portable platform front view.

Referring now to FIGS. 1, 2, and 3, a sensor suite (122) is shown to be in communication with a portable platform (123 and 207) to perform condition monitoring analyses. Analysis is typically done by a technician who walks a route or performs an area survey carrying as a minimum the portable platform (123 and 207) and a dynamic signal analysis sensor such as either a sonic sensor (118), an ultrasonic sensor (117), a vibration sensor (119), a flux sensor also called flux coil (115) or current sensor (114). In addition the technician carries an imaging sensor such as the infrared camera (121) or visible camera (120). Other devices such as an oil sensor (116) may be used as well.

The infrared camera (121) is typically an uncooled focal plane array type imager provides either a formatted digital signal or analog video signal to the portable platform (123). In one embodiment the ergonomically designed infrared imager (121) houses the imaging optics, detector, drive electronics, optical modulator, laser-pointer and four standard or rechargeable AA size batteries. The infrared camera (121) is an example of an image sensor and the output of the infrared camera is referred to as imaging sensor data. In alternate embodiments a visible spectrum digital camera may be the image sensor that produces the imaging sensor data.

Application instructions (109) (typically stored as software or firmware) run on a processor (124) (such as a central processing unit) under an operating system (141) (such as Windows CE®) in the portable platform (123 and 207). The application instructions (109) are used to interpret the analog or digital signal, present this information on the portable display (125), and use the processor (124) to save imaging sensor data (147A, 147B) in the digital memory (140) of the portable platform (123 and 207). The digital memory (140) may include read only memory, random access memory, and media memory such as compact disc data storage.

A visible camera (120) may be integral with the infrared camera (121) or may be independent. The visible camera may include optional lighting accessories such as flash, it may include special optics and wave guide accessories. An optical wave guide is valuable for bore-scope inspection in hard to reach locations of equipment. One embodiment for the visible camera (121) is a point-and-shoot liquid crystal display camera. Another embodiment uses a digital camera suitable for either live or still frame photography including zoom-coupled smart auto-focus system, automatic light guide zoom flash, and low-light features.

The one-way or two-way data transfer sensor communication link (112) between the camera(s) (120, 121) and the portable platform (123 and 207) may be rigid and attached; may be temporarily attached; may be flexible, allowing reorientation different from that of the portable platform; may be connected via cable; or may be in communication with the portable platform via wireless means. In a preferred embodiment, the cameras (120 and 121) are temporarily stored in the portable platform (123 and 207) in one of the storage spaces (220A or 220B or 220C or 220D or 220E-224). In the preferred embodiment a sensor communication link (112) with cameras (120, 121) and power for cameras (120, 121) is provided through one of the connection ports such as general purpose ports (206A, 206B) or alternate connector port (208C). An alternative communication and power connection for cameras (121, 120) is the PCMCIA card interface (211). Such connections between cameras (120, 121) and the portable platform (123 and 207) are examples of sensor interfaces.

A preferred embodiment for a dynamic sensor (119) is a piezoelectric transducer such as a single- or tri-axial accelerometer. Many other dynamic signal analysis sensors can be used instead. These normally supply 4 to 20 mA signal output transmitted through sensor communication link (112).

Alternative dynamic signal measurement devices to the vibration sensor (119) include the sonic sensor (118), ultrasonic sensor (117), flux sensor (115), or current sensor (114). One example includes both sonic and ultrasonic measurements. This device measures decibel values including peak value, peak hold, and average in selected frequency sonic and ultrasonic frequency ranges which are typically 4 kHz, 30 kHz, and 40 kHz. Another example of a sonic sensor is a microphone. An example of a flux sensor is a current frequency clamp.

Power may be supplied from the portable platform (123 and 207) to the sensor(s) (114, 115, 116, 117, 118, 119, 120, 121) through the sensor communication link (112). This power may be temporarily supplied for purpose of recharging battery or may be supplied for the entire time the sensor is in use. For wireless applications using sensor communication link (112) the sensor (114, 115, 116, 117, 118, 119, 120, 121) normally uses it's own battery power which may or may not be recharged by the portable platform (123 and 207).

Sensor ports (208A, 208B) on the portable platform (123 and 207) may include features that provide one-way or two way data transfer between the portable platform (123) and one or more sensors (114, 115, 116, 117, 118, 119, 120, 121), power management and sensor signal interpretation for sensor(s) (114, 115, 116, 117, 118, 119, 120, 121). Sensor ports (208A, 208B) are examples of sensor interfaces.

Optional accessories used in conjunction with dynamic signal analysis include a speed sensor, a tachometer, or a strobe.

In preferred embodiments, a dynamic sensor (119, 118, 117, 115, 114) is connected through sensor communication link (112) to the portable platform (123 and 207) via a sensor port (206A or 206B), which preferably is ruggedized, or via alternate channels such as general purpose ports (206A, 206B) or communication port (208C), or to a PCMCIA card in the PCMCIA slot (211). Such connections serve as sensor interfaces.

When it is not in use, the sensor(s) (114, 115, 116, 117, 118, 119, 120, 121) is(are) stored on the back of the portable platform (123) in a space provided for that purpose. An alternate embodiment uses wireless communication (112) between the sensor(s) (114, 115, 116, 117, 118, 119, 120, 121) and the portable platform (123 and 207).

In the preferred embodiment the oil sensor (116) is fixed rigidly to the lubricating oil system. The oil sensor (116) measures some aspect of the lubrication system such as oil quality, oil level, oil contamination, or mechanical wear debris. For example a capacitive oil sensor can be used to measure the dielectric permittivity of oil and trigger low oil when the level falls to the level of the oil sensor (116). An alternative to mounting the oil sensor (116) in the oil system is to dip the sensor into the oil.

The oil sensor (116) transmits measurements to the portable platform (123 and 207) via electrical or wireless connection (112).

The portable platform (123 and 207) may include optional safety rating for use in hazardous environments including potentially explosive atmospheres.

In a preferred embodiment, the portable platform (123 and 207) includes digital signal processing (DSP), to enable fast measurement time for greater productivity. Productivity is reduced by reducing data collection time and simplifying analysis using high real-time rate, fast auto-ranging, and an extended dynamic range.

In the most preferred embodiments the portable platform (123 and 207) is small and lightweight so that it can easily be carried up ladders and into tight areas, even on the longest routes. The rugged housing will resist damage, and it stands up to harsh operating conditions. The backlit display and special electroluminescent keypad eliminate operational problems in dimly lit areas. For operation in harsh environments, speed enables the user to obtain quality data with minimal personal exposure.

The portable platform (123 and 207) typically includes a processor (124), a portable display (125 and 204), a portable power source (126), one or more data input and data output ports such as transmitter (127) and general purpose ports (206A, 206B), a field user interface (111, 200, 201, 202, 203, 205, 212, 213), a portable database (108), application instructions (109), one or more sensor ports (208A, 208B), and an alternate connector port (208C). General-purpose ports (206A, 206B) and alternate connector port (208C) may be serial ports, USB ports, or custom ports designed specifically for use in the portable platform (123 and 207). When connected to the sensor suite (122), the portable platform (123 and 207) is typically in one-way or two-way communication (112) with the sensor suite (122) through a sensor ports (208A, 208B) using wired or wireless mechanisms. In alternate embodiments general purpose ports (206A, 206B) or alternate connector port (208C) may be used in combination with, or in place of, sensor ports (208A, 208B) for connecting portable platform (123 and 207) to the sensor suite (122). In such embodiments general purpose ports (206A, 206B) and alternate connector port (208C) serve as a sensor interface. In some embodiments the portable platform (123 and 207) may receive data from sources other than a sensor suite. For example, the portable platform may be equipped for receiving image data and sensor data from a network server, from another portable platform, from a base station, or from another similar source. In the most preferred embodiments, a primary function of the portable platform (123 and 207) is capturing imaging sensor data (147A, 147B) and dynamic sensor data (146A, 146B). In some embodiments the process of capturing the data includes storing the data in the portable database (108). The portable platform (123 and 207) may also communicate with a base station (101) via one-way or two-way data transfer via electrical contact or wireless mechanisms such as an appropriate PCMCIA card interface (211). In preferred embodiments the portable platform (123 and 207) includes at least a transmitter for data transfer and the base station (101) includes at least a receiver for data transfer. In some embodiments the process of capturing data does not include storing the data in the portable platform (123 and 207); instead the data are transmitted directly to the base station (101) without storage in the portable platform (123 and 207). The base station (101) typically also includes a central processor, which is typically a conventional central processing unit but in alternate embodiments may be thin client processor, an application specific integrated circuit, or similar electronics. The base station (101) generally incorporates station digital memory, such as read only memory, random access memory, and media memory such as compact disc data storage. The base station (101) typically runs application software (106) which controls data input/output through sensor communication link (112) and (when used) base communication link (107). The application software (106) also accepts user input through user interface One embodiment of the portable platform employs a modified version of a equipment analyzer which already works in conjunction with a plurality of dynamic signal sensors including vibration sensor (119), sonic sensor (118), ultrasonic sensor (117), flux sensor (115), and current sensor (114). Major modifications to the equipment analyzer accommodate the preferred embodiment include more than one sensor ports (208A, 208B), application instructions (109), and portable database (108), to accommodate the addition of camera(s) (120, 121) and oil sensor(s) (116).

The preferred embodiment for the portable platform employs carrying straps attached to slots (209A, 209B, 209C, 209D) on the portable platform.

In the preferred embodiment a portable display (125, 204) is a transflective, color, liquid crystal display with selectable backlighting. One optional configuration is to use a touch-screen display. Another optional configuration is a microphone (213) for sound recording at least voice information when using the portable platform (123 and 207). Still another optional configuration includes a speaker (214) for audio output.

In some embodiments it is envisioned that the portable platform (123 and 207) or base station (101) might include voice recognition and/or text-to-voice features to facilitate expanded user interface.

In the preferred embodiment the portable display (125) functions as part of the user interface (111) providing visual communication to the user in the field. An optional configuration includes microphone and speaker so that the video interface is supplemented with audio output and sound recording for voice annotation.

The preferred embodiment uses rechargeable batteries to provide portable power (126) to operate the portable platform (123) and may also be used to power sensor(s) (114, 115, 116, 117, 118, 119, 120, 121).

Transmitter (127) is used to provide data output through electrical, wireless, visual, and possibly audio means. Sensor(s) (114, 115, 116, 117, 118, 119, 120, 121) connect to the portable platform by electrical or wireless mechanisms.

In the preferred embodiment the portable database(s) (108) is(are) derived from that(those) used in a equipment analyzer with additional support as needed to accommodate visible and infrared cameras (120, 121) and oil sensor(s) (116). An alternate embodiment is to employ all of the database elements into the portable database. This database already supports imaging and dynamic signal analysis data sources, but generally requires modification to operate on the processor (124) rather than the central processor (102) as part of the optional base station (101). In this alternate embodiment, replication or a similar concept may be used to synchronize the portable database (108) with the stationary database (105) which may also be a derivative of the stationary database (105).

In the preferred embodiment the application instructions (109) operate on the portable platform (123,207) enabling embedded intelligence, fast data collection, advanced bearing analysis using stress wave analysis methodology, reliable slow speed measurements, single or dual channel or multi-channel analysis, balancing, laser alignment, cascade, transient analysis, motor monitoring, imaging, and thermography. The user is directly notified about the nature of a developing fault at the time of measurement. This enables the user to focus attention on critical machine issues as soon as they are identified and collect additional diagnostic information while still at the machine site.

In the preferred application instructions (109) embodiment the user can choose from a menu of special tests and it automatically configures itself for collecting additional data to focus in on the problem.

Optional features for the application instructions (109) include demodulation, used for early detection tool due to its ability to isolate specific fault frequencies associated with the developing bearing or gear fault; and stress wave analysis, which goes beyond demodulation's ability to identify the fault by providing an objective, trend suitable measure of the fault severity.

In one embodiment the application instructions (109) includes advanced digital technology to detect the stress waves generated by faults such as fatigue cracking, cracked gear teeth, abrasive wear, scuffing, or impacting in their earliest stages. The early and accurate detection provided by stress wave analysis results in improved maintenance planning, enabling the user to lower costs, decrease downtime, and reduce spare parts inventory.

In one embodiment the application instructions (109) includes slow speed technology to take reliable readings with single or even dual integration as low as 10 RPM.

In one embodiment the application instructions (109) includes cascade analysis which quickly captures a series of FFT spectra during startup or coast-down, which can be displayed as a waterfall plot. It can also be used for short-term continuous monitoring of critical machine problems.

The application instructions (109) and portable platform (123 and 207) may support dual channel capability which can reduce data collection time by as much as 50%. The productivity gains alone typically justify the investment. Far beyond productivity improvements, the dual channel analyzer opens up new analysis possibilities to confirm faults such as misalignment, looseness, cracks, and structural resonance. The dual channel analyzer also provides filtered orbit analysis. The dual channel dynamic signal analyzer includes the advanced cross-channel program as a standard module to determine the root cause of a failure. Embedded intelligence makes cross channel analysis easy to use with minimal training. The companion software can be used to analyze and archive the results, plus provides a custom data export link to operating deflection shape and modal analysis software.

Optional application instructions (109) programs are available for the dynamic signal analyzer may be used for transient, balancing and laser alignment. The optional advanced transient program turns the dynamic signal analyzer into a single or dual channel digital tape recorder with full analysis capabilities.

Another optional application instructions (109) program supports the analyzer being used for shop or field balancing. In a particular embodiment the graphical interface makes operation simple and helps avoid the typical errors made in balancing setup. The program systematically removes background vibration while the balancing watchdog expert alerts the user to other conditions that could complicate the balance job.

The application instructions (109) supports imaging and image analysis. In the preferred embodiment this includes visual imaging, thermal imaging. Optional thermographic image analysis includes display of radiometric images in selectable modes including grayscale, ironbow, rainbow, and/or other pallets. Typically the display field also includes a legend depicting temperatures to which colors and shades correspond. The user normally selects one or more points for which actual temperature is displayed in text as well as pixel color/shade. Stored images and video clips can be recalled for display, annotation, and editing in the field. Such images and video clips are examples of imaging sensor data.

The application instructions (109) used in the preferred embodiment supports watch variable data collection including notes and observations representing visual, audible, and otherwise perceived observations logged by the technician using the portable platform.

Each sensor port (208A, 208B) included in the portable platform (123 and 207) is configured to one or more of the array of sensors in the sensor suite (122). In most embodiments this includes signal interpretation. It typically also includes mechanisms for attachment and transport of the one or more sensors when it or they is or are not in use, and sensor communication (112) with each sensor during use. It may also include power supplied to the sensors for the purposes of either measurement or recharging sensor batteries.

Connection between the portable platform (123 and 207) and the sensor suite (122) includes physical connection and data communication. In one embodiment physical connection and communication to the sensors makes use of one or more ports such as PCMCIA card interface (211). In another embodiment communication is wireless using either radio frequency or infrared data transfer mechanisms. Sensors may be attached to the portable platform (123 and 207) in a convenient location such as on the back of the analyzer package (220A or 220B or 220C or 220D or 220E).

One optional embodiment includes a feature enabling printing to be accomplished directly from the portable platform (123 and 207). Typically this is done using application instructions to format the signal with printer instructions. Communication to the printer may be made through a printer port (210) or via wireless means or directly to an integral printing device.

Optional connection between the portable platform and the base station (101) is provided for the broadest application of this invention. In the preferred embodiment, the base station (101) may include these elements: computer operating system (143), receiver (104), stationary database (105), computer display (142), central processor (102), application software (105), and connection and base communication link (107) to the portable platform. The computer operating system (143) is typically Microsoft Windows® or Microsoft Windows CE®, although other operating systems may be used. The central processor (102) is typically a desktop central processing unit. The base communication link (107) may be wired or wireless. The base station is an optional embodiment because all of these functions could be performed in the portable platform if one desires. One may prefer to maintain a stationary database (105) and all that goes with it to provide greater integration with other asset management database and software applications, to provide multi-user network, to provide memory backup, to provide extended memory and analysis tools, to allow the user to perform final analysis and reporting functions in a comfortable location, to allow others ready access to the information, for fuller integration with systems, and for other individual reasons.

A standard desktop CPU is preferred as the central processor (102) in the base station (101), although other devices such as an application specific integrated circuit (ASIC) may be used.

In the preferred embodiment, the printer (103) is in communication with the central processor (102) as part of the base station (101) system. Typically the printer drivers are provided with the base software (106) although one could easily connect or incorporate or simply communicate the printer, when used, directly with the portable platform (123 and 207).

The printer (103) is one way to report results. Other, equally acceptable methods include electronic reporting via file transfer using data files or PDF style reports or other style reports. An alternate reporting method is email messaging or voice mail messaging or display messaging or other ways to let the intended recipient know about data and information derived from sensor inputs and personal observations.

There are many embodiments for the receiver (104) on the base platform (101) including devices using file transfer protocol, replication, serial communication, manual data entry, and others. The base communication link (107) can include physical connection or wireless connection between the base station (101) and portable platform (123 and 207). This base communication link (107) may include linkage through an Ethernet or internet or intranet or other network.

The preferred embodiment for base station software and stationary database are extended versions of commercially available reliability software (106) and stationary database (105). Logical upgrades to these commercially available tools are required to support the invention. An alternate embodiment uses similar software and database structure on both the portable platform (123 and 207) and base station (101), including replication or another method for synchronizing database information between the two systems. Another alternate embodiment uses wireless Ethernet or similar communication through the base communication link (107) such that the stationary database (105) receives data directly or shortly after it is collected in the field. In this case the portable database(s) (108) can be very small or nonexistent since the data is being directly stored onto the base station (101).

One can envision that by using Ethernet or internet or other on-line communication as at least part of base communication link (107) between the portable platform (123 and 207) and base station (101) that the distinction between base software (106) and application instructions (109) can shift such that the base software can supplement or replace or update the functions envisioned in this invention for the application instructions (109). In the same way, the database functions may be performed in the stationary database (105) or the portable database (108) or some combination of both.

By using base communication link (107), some or all of the software functions (106 and 109), the database functions (105, 108), and optional printer function (103), and even functions of the sensor ports (208A, 208B) may be performed using either the portable platform (123 and 207) or the base station (101) or some combination of both.

A physical embodiment of a portable platform is depicted in FIGS. 2 and 3 as portable platform (207). FIG. 2 portrays the front (or top) of the portable platform (207), and FIG. 3 portrays the back (or bottom) of the portable platform (207). A display (204) performs a plurality of functions including display of header information (205) for location, equipment information, summary, or other information used to orient the user to the type of information on the remaining portions of the display. Another function of the display (204) in the preferred embodiment is the allocation of one or more windows (203A, 203B, 203C, 203D) of the display (204) to reporting measurements, images and graphics to facilitate translating measured data into useful information. In this application, a window refers to any pop-up or overlay or highlighted area or sector or portion or otherwise set-aside vicinity of the display in which a particular function is performed. The windows (203A, 203B, 203C, 203D) of the display (204) may depict vibration spectrum, vibration waveforms, bar graph, visual images, trend plots, tabular data, setup information, etc.

These display windows (203A, 203B, 203C, 203D) are easily adapted for dynamic signal analysis and for imaging analysis functions. Functions historically performed on the display of an infrared camera may be performed on the display windows (203A, 203B, 203C, 203D) including but not limited to the following list: live thermal image, live visual image, frozen visual image, frozen thermal image, text annotation, graphic annotation, temperature at cursor points, temperature histogram, temperature profile, alarms, parameters, user instructions, etc. Functions historically performed on the display of a dynamic signal analyzer may be performed on the display windows (203A, 203B, 203C, 203D). These include but are not limited to active waveform, active spectrum, individual waveform, individual spectrum, trend, data table, alarms, parameters, graphic representation, dynamic or frozen modal analysis, demodulated spectrum or waveform, cascade, transient, etc.

Another display function in the preferred embodiment it to provide dynamic or changeable function selections (212) corresponding to function keys (200). In the case of a touch-screen display (204) the function keys (200) might be combined with function key descriptions (202).

Preferred embodiments use sensor ports (208A, 208B) for data input and output from sensors. Alternately other ports such as the PCMCIA card interface (211) or even printer port (210) may also be used. The preferred embodiment provides for user supplied data input through field user interface (111 in FIG. 1) and output through the portable display (204). In preferred embodiments, field user interface (111) includes dynamic function keys (200), function descriptions (202), keypad interface (201), changeable function selections (212), display windows (203A, 203B, 203C, 203D), header information (205), and microphone (213). The user may also provide input via one or more of the sensor (114, 115, 116, 117, 118, 119, 120, or 121 in FIG. 1) in communication with the portable platform through the portion of the sensor communication link (112 in FIG. 1) serving such sensor(s).

The portable platform (123 and 207) is substantially contained in a housing (215). One or more strap slots (209A, 209B, 209C, 209D) may be provided in the housing (215) to facilitate attaching one or more carrying straps to the platform, or to facilitate tie-downs for retaining the portable platform in a fixture or carrying case.

FIG. 3 also illustrates 5 storage spaces (220A or 220B or 220C or 220D or 220E, 221, 222, 223, and 224). These spaces are recesses in the back/bottom of portable platform (123 and 207) which are specifically dimensioned to hold sensors or other accessory devices used with the portable platform (123 and 207).

Figure 4:
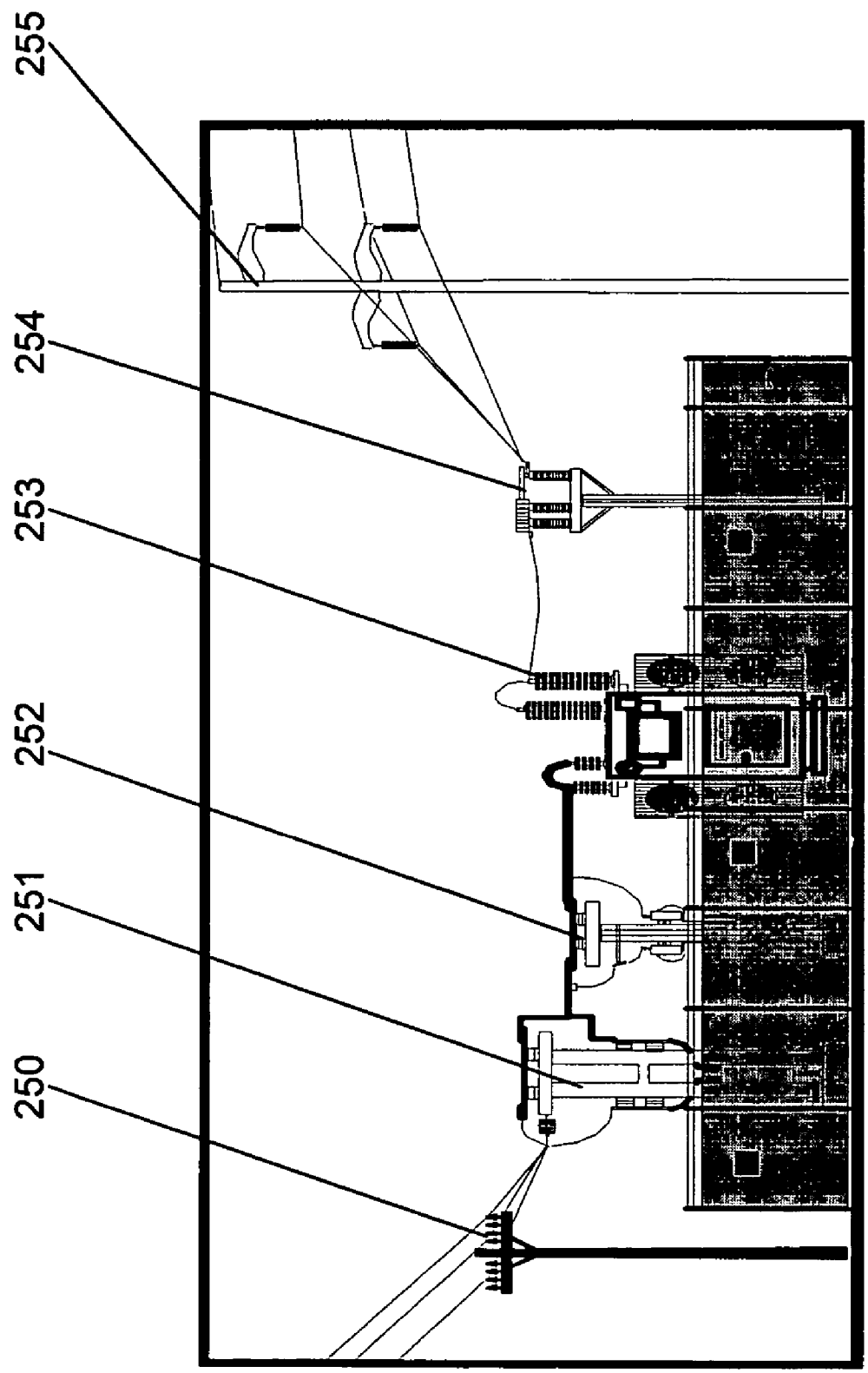
FIG. 4 is a schematic representation of a portable platform back view.

An example of an application of embodiments is depicted in the switchyard diagram of FIG. 4. Various components of the switchyard are depicted. These are (from right to left) high voltage transmission lines (255), disconnect (254), transformer (253), potential and current transformers (252), circuit breaker (251), and low voltage transmission lines (250). Table 1 shows how a portable platform with multiple sensor technologies may be used to inspect a switchyard.

TABLE 1

Inspection of switchgear with an integrated system.

| | Sensor Applicability | | | | |
|---|---|---|---|---|---|
| Component | IR | Visible | Ultrasonic | Vibration | Oil Analysis |
| Power line | Yes | Yes | Yes | No | No |
| Connection | Yes | Yes | Yes | No | No |
| Insulator | Yes | Yes | Yes | No | No |
| Bushing | Yes | Yes | Yes | No | Yes |
| Junction | Yes | Yes | Yes | No | No |
| Coupling | Yes | Yes | Yes | No | No |
| Disconnect | Yes | Yes | Yes | No | No |
| Current transformer | Yes | Yes | Yes | No | Yes |
| Disconnect | Yes | Yes | Yes | No | No |
| Main transformer | Yes | Yes | Yes | No | Yes |
| Load tap changer | Yes | No | Yes | No | No |
| Breaker | Yes | Yes | Yes | No | Yes |
| Operating status | Yes | Yes | No | No | No |
| Cooling system | Yes | Yes | No | No | No |
| Motor | Yes | Yes | No | Yes | No |
| Pump | Yes | Yes | No | Yes | No |
| Gas compressor | Yes | Yes | Yes | Yes | Yes |

Table 1 presents a matrix of different combinations of sensors that may beneficially be employed to measure the health of particular components in an electrical switchyard. Various embodiments may be used to check each of the components listed in each row of the Table 1 by incorporating sensor capability identified in the columns where "yes" is listed in that row. Matrix elements labeled "No" indicate that the sensor in that column is generally not applicable for inspecting the component in that row. However, under special circumstances such use may be appropriate.

Figure 5:
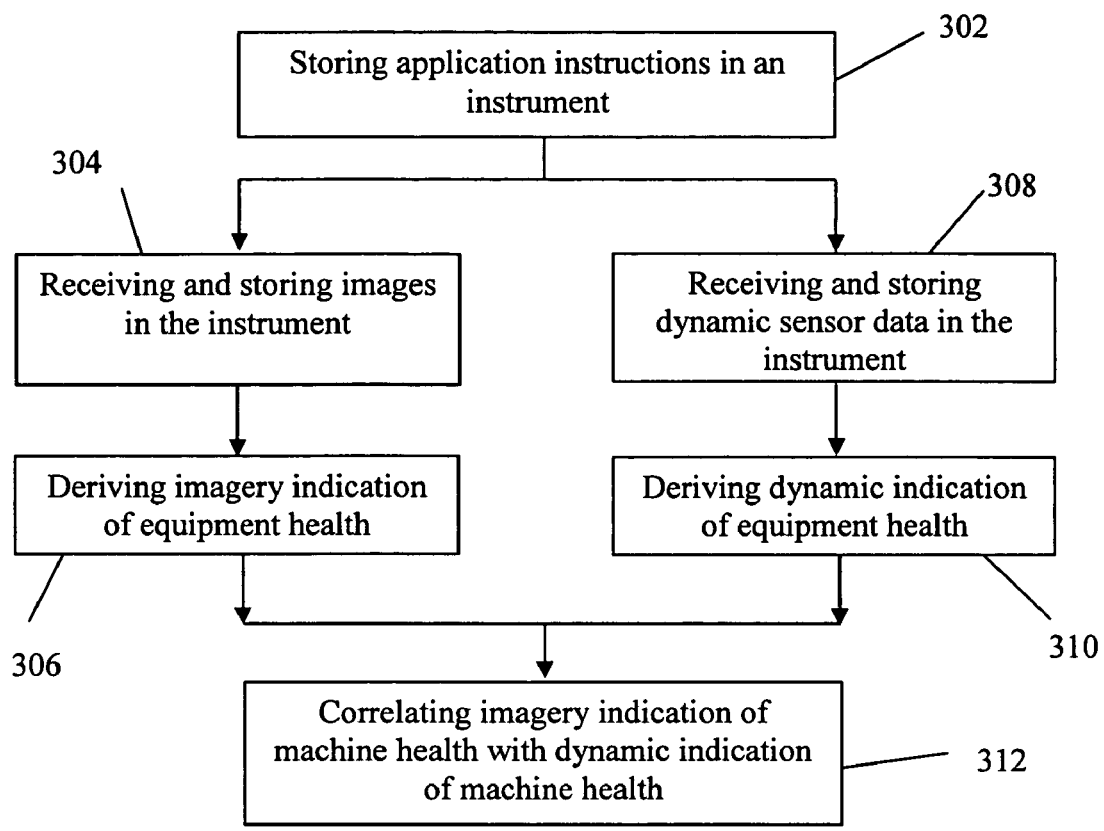
FIG. 5 is a flow chart of one method embodiment.

FIG. 5 illustrates a method embodiment of the invention. The method begins with a storing application instructions in an instrument step (302). Then two additional processes are conducted. One of these processes involves a receiving and storing imaging sensor data in the instrument step (304) followed by a deriving imagery indication of equipment health step (306). The other of these two additional processes includes a receiving and storing dynamic sensor data in the instrument step (308) followed by a deriving dynamic indication of equipment health step (310). It is cautioned that while FIG. 5 might incorrectly be interpreted to show that the two additional processes are conducted in concurrently in parallel, the two additional processes do not necessarily have to be conducted concurrently in parallel (although they may be). For example, the receiving imaging sensor data in the instrument step (304) and the deriving imagery indication of equipment health step (306) may be completed before beginning the receiving dynamic sensor data in the instrument step (308) and the deriving dynamic indication of equipment health step (310), or steps (308) and (310) may be completed before beginning steps (304) and (306). Alternately, the receiving imaging sensor data in the instrument step (304) may be conducted first, followed by the receiving dynamic sensor data in the instrument step (308). Using the reverse sequence of those two steps is also possible. However, the deriving imagery indication of equipment health step (306) must be preceded (although not immediately preceded) by the receiving imaging sensor data in the instrument step (304), and the deriving dynamic indication of equipment health step (310) must be preceded (although not immediately preceded) by the receiving dynamic sensor data in the instrument step (308). After the deriving imagery indication of equipment health step (306) and the deriving dynamic indication of equipment health step (310) are completed, the step (312) of correlating imagery indication of machine health with dynamic indication of machine health may be undertaken and completed.

Figure 6:
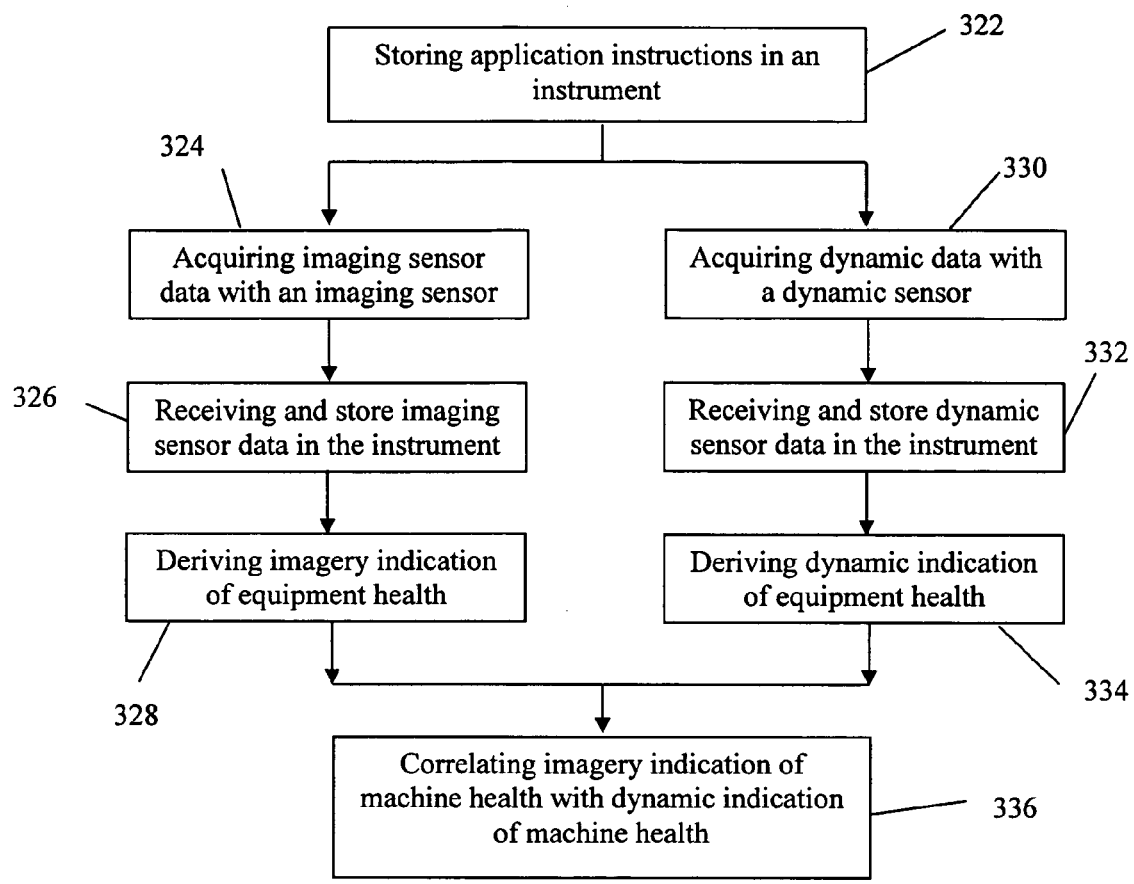
FIG. 6 is a flow chart of an alternate method embodiment.

FIG. 6 illustrates a different method embodiment of the invention. The method begins in a manner similar to the method of FIG. 5 with a storing application instructions in an instrument step (322). Then two further processes are conducted. One of these processes involves an acquiring imaging sensor data with an imaging sensor step (324), followed by a receiving and storing imaging sensor data in the instrument step (326) followed by a deriving imagery indication of equipment health step (326). The other of these two further processes includes acquiring dynamic sensor data with a dynamic sensor step (330), a receiving and storing dynamic sensor data in the instrument step (332), followed by a deriving dynamic indication of equipment health step (334). As with FIG. 5, the two further processes do not have to be conducted concurrently in parallel. Steps (324), (326) and (328) may be completed before beginning steps (330), (332) and (334), or vice versa. Alternately, the acquiring image data with an imaging sensor step (324) may be conducted first, followed by the acquiring dynamic sensor data with a dynamic sensor step (330). Using the reverse sequence of those two steps is also possible. However, sequence of steps following the acquiring image data with an imaging sensor step (324) have to proceed sequentially (but not immediately) in the order shown, and the sequence of steps following the acquiring dynamic sensor data with a dynamic sensor step (330) have to proceed sequentially (but not immediately) in the order shown. After the deriving imagery indication of equipment health step (328) and the deriving dynamic indication of equipment health step (334) are completed, the correlating imagery indication of machine health with dynamic indication of machine health step (336) may be undertaken and completed.

Figure 7:
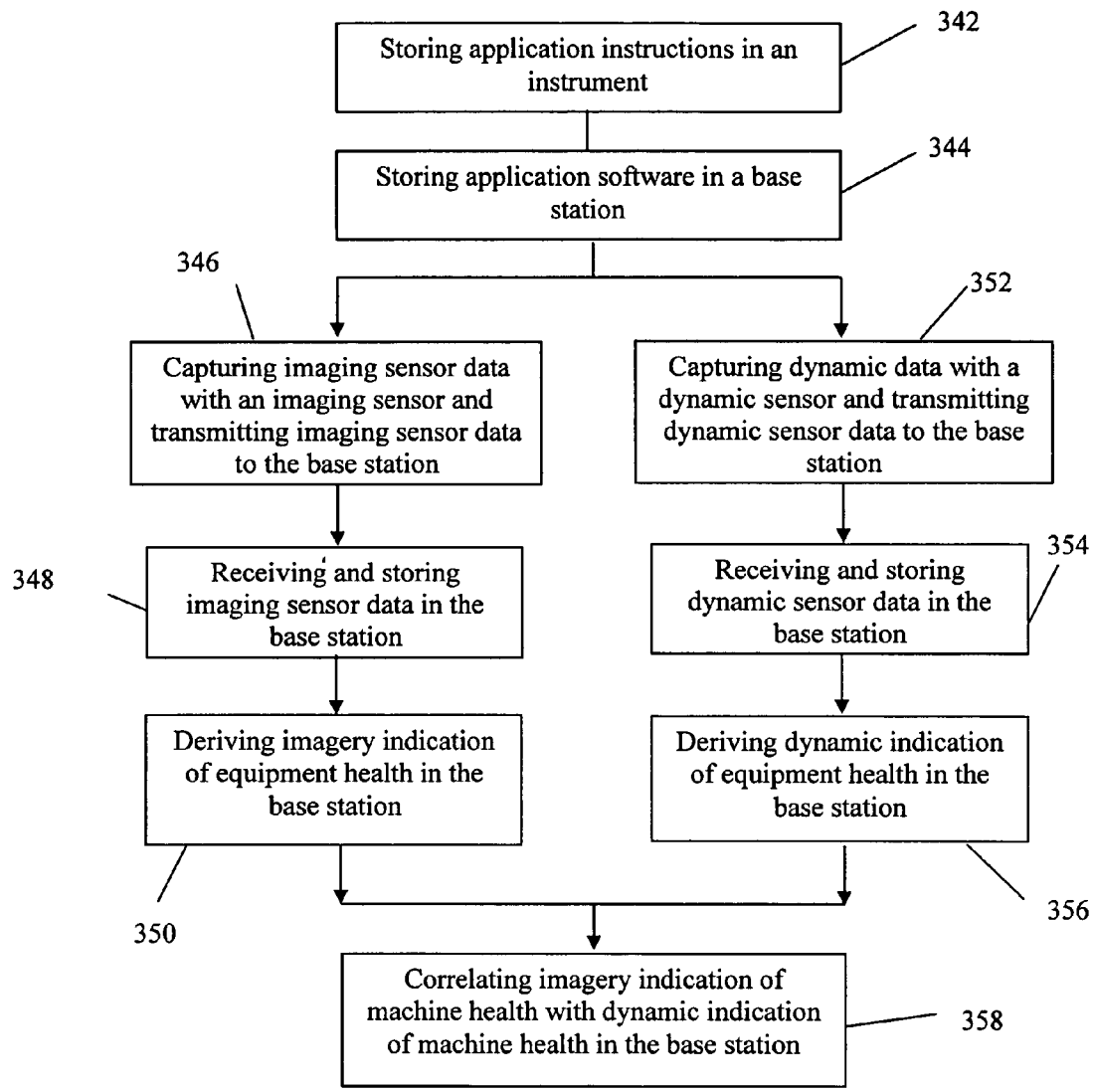
FIG. 7 is a flow chart of a further alternate method embodiment.

FIG. 7 illustrates a further alternate method, one that incorporates the use of a base station. The method begins with a storing application instructions in an instrument step (342) and a storing application software in a base station step (342). These steps may be completed in any order. Then two subsequent processes are conducted. One of these processes involves the step (346) of capturing imaging sensor data with an imaging sensor operatively connected to the instrument and using the instrument to transmit the imaging sensor data to the base station, followed by the step (348) receiving and storing the imaging sensor data in the base station, followed by the step (350) of deriving imagery indication of equipment health in the base station. The other of these two subsequent processes includes the step (352) of capturing dynamic sensor data with a dynamic sensor operatively connected to the instrument and using the instrument to transmit the dynamic sensor data to the base station, followed by the step (354) of a receiving and storing dynamic sensor data in the base station, followed by a deriving dynamic indication of equipment health step (356). As with FIGS. 5 and 6, the two subsequent processes do not necessarily have to be conducted concurrently in parallel. However, sequence of steps following the step (346) of capturing imaging sensor data with an imaging sensor and transmitting the imaging sensor data to the base station have to proceed sequentially (but not immediately) in the order shown, and the sequence of steps following step (352) of capturing dynamic sensor data with a dynamic sensor and transmitting the dynamic sensor data to the base station have to proceed sequentially (but not immediately) in the order shown. After the step (350) of deriving imagery indication of equipment health in the base station and step (356) of the deriving dynamic indication of equipment health in the base station are completed, the correlating imagery indication of machine health with dynamic indication of machine health step (358) may be undertaken and completed.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for inspecting equipment, the method comprising,
   storing in a portable instrument (a) application instructions for receiving, storing and analyzing focal plane array imaging sensor data to derive at least one imagery indication of equipment health, (b) application instructions for receiving, storing, and analyzing dynamic sensor data to derive at least one dynamic indication of equipment health wherein the analyzing dynamic sensor data includes one or more analyzing techniques selected from the following group: Fast Fourier Transform (FFT) vibration analysis, waveform vibration analysis, spectral vibration analysis, stress wave analysis, transient analysis, sonic analysis, ultrasonic analysis, FFT flux analysis, and FFT current analysis, and (c) application instructions for correlating at least one imagery indication of equipment health with at least one dynamic indication of equipment health;

while on a route or survey, receiving and storing focal plane array imaging sensor data and dynamic sensor data at approximately the same time in the portable instrument using at least a portion of the application instructions;

deriving at least one imagery indication of equipment health comprising thermographic image data from the imaging sensor data using at least a portion of the application instructions;

deriving at least one dynamic indication of equipment health comprising an ultrasonic dB value from the dynamic sensor data using at least the dynamic signal analysis portion of the application instructions, wherein the at least one imagery indication of equipment health and the at least one dynamic indication of equipment health are derived from the imaging sensor data and the dynamic sensor data that were acquired at approximately the same time; and correlating the thermographic image data with the ultrasonic dB value to assess performance of a valve.

2. The method of claim 1 wherein the step of storing in an instrument application instructions for receiving, storing and analyzing focal plane array imaging sensor data comprises storing in an instrument application instructions for receiving, storing and analyzing focal plane array infrared imaging sensor data, and the step of receiving and storing focal plane array imaging sensor data in the instrument comprises receiving and storing focal plane array infrared imaging sensor data in the instrument.

3. The method of claim 1 wherein the step of storing in an instrument application instructions for receiving, storing and analyzing dynamic sensor data comprises storing in an instrument application instructions for receiving, storing and analyzing dynamic sensor data using FFT analysis, and the step of deriving at least one dynamic indication of equipment health comprises deriving at least one dynamic indication of equipment health using FFT analysis.

4. A method for inspecting equipment, the method comprising, storing in a portable instrument (a) application instructions for receiving, storing and analyzing focal plane array imaging sensor data to derive at least one imagery indication of equipment health, and (b) application instructions for receiving, storing, and analyzing dynamic sensor data to derive at least one dynamic indication of equipment health wherein the analyzing dynamic sensor data includes one or more analyzing techniques selected from the following group: Fast Fourier Transform (FFT) vibration analysis, waveform vibration analysis, spectral vibration analysis, stress wave analysis, transient analysis, sonic analysis, ultrasonic analysis, FFT flux analysis, and FFT current analysis, and (c) application instructions for correlating at least one imagery indication of equipment health with at least one dynamic indication of equipment health;

while on a route or survey, receiving and storing focal plane array imaging sensor data and dynamic sensor data in the portable instrument using at least a portion of the application instructions;

deriving at least one imagery indication of equipment health comprising a thermal indication from the imaging sensor data using at least a portion of the application instructions;

deriving at least one dynamic indication of equipment health from the dynamic sensor data using at least the dynamic signal analysis portion of the application instructions; and while on the route or survey, isolating a fault from a normal condition using both the imagery indication and the dynamic sensor indication to conclude whether the thermal indication likely indicates a normal condition or an abnormal condition.

5. A method for inspecting equipment, the method comprising, storing in a portable instrument (a) application instructions for receiving, storing and analyzing focal plane array imaging sensor data to derive at least one imagery indication of equipment health, (b) application instructions for receiving, storing, and analyzing dynamic sensor data to derive at least one dynamic indication of equipment health wherein the analyzing dynamic sensor data includes one or more analyzing techniques selected from the following group: Fast Fourier Transform (FFT) vibration analysis, waveform vibration analysis, spectral vibration analysis, stress wave analysis, transient analysis, sonic analysis, ultrasonic analysis, FFT flux analysis, and FFT current analysis, and (c) application instructions for correlating at least one imagery indication of equipment health with at least one dynamic indication of equipment health;

while on a route or survey, receiving and storing focal plane array imaging sensor data and dynamic sensor data at approximately the same time in the portable instrument using at least a portion of the application instructions;

deriving at least one imagery indication of equipment health comprising an infrared image showing relatively hot coupling from the imaging sensor data using at least a portion of the application instructions;

deriving at least one dynamic indication of equipment health comprising vibration analysis from the dynamic sensor data using at least the dynamic signal analysis portion of the application instructions, wherein the at least one imagery indication of equipment health and the at least one dynamic indication of equipment health are derived from the imaging sensor data and the dynamic sensor data that were acquired at approximately the same time; and correlating the infrared image showing relatively hot coupling with vibration analysis results to assess hardware misalignment.

6. The method of claim 5 wherein the step of storing in an instrument application instructions for receiving, storing and analyzing focal plane array imaging sensor data comprises storing in an instrument application instructions for receiving, storing and analyzing focal plane array infrared imaging sensor data, and the step of receiving and storing focal plane array imaging sensor data in the instrument comprises receiving and storing focal plane array infrared imaging sensor data in the instrument.

7. The method of claim 5 wherein the step of storing in an instrument application instructions for receiving, storing and analyzing dynamic sensor data comprises storing in an instrument application instructions for receiving, storing and analyzing dynamic sensor data using FFT analysis, and the step of deriving at least one dynamic indication of equipment health comprises deriving at least one dynamic indication of equipment health using FFT analysis.

8. A method for inspecting equipment, the method comprising, storing in a portable instrument (a) application instructions for receiving, storing and analyzing focal plane array imaging sensor data to derive at least one imagery indication of equipment health, (b) application instructions for receiving, storing, and analyzing dynamic sensor data to derive at least one dynamic indication of equipment health wherein the analyzing dynamic sensor data includes one or more analyzing techniques selected from the following group: Fast Fourier Transform (FFT) vibration analysis, waveform vibration analysis, spectral vibration analysis, stress wave analysis, transient analysis, sonic analysis, ultrasonic analysis, FFT flux analysis, and FFT current analysis, and (c) application instructions for correlating at least one imagery indication of equipment health with at least one dynamic indication of equipment health;

while on a route or survey, receiving and storing focal plane array imaging sensor data and dynamic sensor data at approximately the same time in the portable instrument using at least a portion of the application instructions;

deriving at least one imagery indication of equipment health comprising delta-temperature data from the imaging sensor data using at least a portion of the application instructions;

deriving at least one dynamic indication of equipment health comprising heterodyned ultrasonic sounds from the dynamic sensor data using at least the dynamic signal analysis portion of the application instructions, wherein the at least one imagery indication of equipment health and the at least one dynamic indication of equipment health are derived from the imaging sensor data and the dynamic sensor data that were acquired at approximately the same time; and correlating the delta-temperature data with the heterodyned ultrasonic sounds to assess a power line insulator connection.

9. The method of claim 8 wherein the step of storing in an instrument application instructions for receiving, storing and analyzing focal plane array imaging sensor data comprises storing in an instrument application instructions for receiving, storing and analyzing focal plane array infrared imaging sensor data, and the step of receiving and storing focal plane array imaging sensor data in the instrument comprises receiving and storing focal plane array infrared imaging sensor data in the instrument.

10. The method of claim 8 wherein the step of storing in an instrument application instructions for receiving, storing and analyzing dynamic sensor data comprises storing in an instrument application instructions for receiving, storing and analyzing dynamic sensor data using FFT analysis, and the step of deriving at least one dynamic indication of equipment health comprises deriving at least one dynamic indication of equipment health using FFT analysis.

11. A method for inspecting equipment, the method comprising, storing in a portable instrument (a) application instructions for receiving, storing and analyzing focal plane array imaging sensor data to derive at least one imagery indication of equipment health, (b) application instructions for receiving, storing, and analyzing dynamic sensor data to derive at least one dynamic indication of equipment health wherein the analyzing dynamic sensor data includes one or more analyzing techniques selected from the following group: Fast Fourier Transform (FFT) vibration analysis, waveform vibration analysis, spectral vibration analysis, stress wave analysis, transient analysis, sonic analysis, ultrasonic analysis, FFT flux analysis, and FFT current analysis, and (c) application instructions for correlating at least one imagery indication of equipment health with at least one dynamic indication of equipment health;

while on a route or survey, receiving and storing focal plane array imaging sensor data and dynamic sensor data at approximately the same time in the portable instrument using at least a portion of the application instructions;

deriving at least one imagery indication of equipment health comprising a bore scope image from the imaging sensor data using at least a portion of the application instructions;

deriving at least one dynamic indication of equipment health comprising a vibration spectrum from the dynamic sensor data using at least the dynamic signal analysis portion of the application instructions, wherein the at least one imagery indication of equipment health and the at least one dynamic indication of equipment health are derived from the imaging sensor data and the dynamic sensor data that were acquired at approximately the same time; and correlating the bore scope image with the vibration spectrum to characterize gear or bearing components.

12. The method of claim 11 wherein the step of storing in an instrument application instructions for receiving, storing and analyzing focal plane array imaging sensor data comprises storing in an instrument application instructions for receiving, storing and analyzing focal plane array infrared imaging sensor data, and the step of receiving and storing focal plane array imaging sensor data in the instrument comprises receiving and storing focal plane array infrared imaging sensor data in the instrument.

13. The method of claim 11 wherein the step of storing in an instrument application instructions for receiving, storing and analyzing dynamic sensor data comprises storing in an instrument application instructions for receiving, storing and analyzing dynamic sensor data using FFT analysis, and the step of deriving at least one dynamic indication of equipment health comprises deriving at least one dynamic indication of equipment health using FFT analysis.

14. A method for inspecting equipment, the method comprising, storing in a portable instrument (a) application instructions for receiving, storing and analyzing focal plane array imaging sensor data to derive at least one imagery indication of equipment health, (b) application instructions for receiving, storing, and analyzing dynamic sensor data to derive at least one dynamic indication of equipment health wherein the analyzing dynamic sensor data includes one or more analyzing techniques selected from the following group: Fast Fourier Transform (FFT) vibration analysis, waveform vibration analysis, spectral vibration analysis, stress wave analysis, transient analysis, sonic analysis, ultrasonic analysis, FFT flux analysis, and FFT current analysis, and (c) application instructions for correlating at least one imagery indication of equipment health with at least one dynamic indication of equipment health;

while on a route or survey, receiving and storing focal plane array imaging sensor data and dynamic sensor data at approximately the same time in the portable instrument using at least a portion of the application instructions;

deriving at least one imagery indication of equipment health comprising image data from the imaging sensor data using at least a portion of the application instructions;

deriving at least one dynamic indication of equipment health comprising vibration data from the dynamic sensor data using at least the dynamic signal analysis portion of the application instructions, wherein the at least one imagery indication of equipment health and the at least one dynamic indication of equipment health are derived from the imaging sensor data and the dynamic sensor data that were acquired at approximately the same time; and correlating image and vibration data before and after thermal growth to evaluate misalignment.

15. The method of claim 14 wherein the step of storing in an instrument application instructions for receiving, storing and analyzing focal plane array imaging sensor data comprises storing in an instrument application instructions for receiving, storing and analyzing focal plane array infrared imaging sensor data, and the step of receiving and storing focal plane array imaging sensor data in the instrument comprises receiving and storing focal plane array infrared imaging sensor data in the instrument.

16. The method of claim 14 wherein the step of storing in an instrument application instructions for receiving, storing and analyzing dynamic sensor data comprises storing in an instrument application instructions for receiving, storing and analyzing dynamic sensor data using FFT analysis, and the step of deriving at least one dynamic indication of equipment health comprises deriving at least one dynamic indication of equipment health using FFT analysis.

17. A method for inspecting equipment, the method comprising,
storing in a portable instrument (a) application instructions for receiving, storing and analyzing focal plane array imaging sensor data to derive at least one imagery indication of equipment health, (b) application instructions for receiving, storing, and analyzing dynamic sensor data to derive at least one dynamic indication of equipment health wherein the analyzing dynamic sensor data includes one or more analyzing techniques selected from the following group: Fast Fourier Transform (FFT) vibration analysis, waveform vibration analysis, spectral vibration analysis, stress wave analysis, transient analysis, sonic analysis, ultrasonic analysis, FFT flux analysis, and FFT current analysis, and (c) application instructions for correlating at least one imagery indication of equipment health with at least one dynamic indication of equipment health;

while on a route or survey, receiving and storing focal plane array imaging sensor data and dynamic sensor data at approximately the same time in the portable instrument using at least a portion of the application instructions;

deriving at least one imagery indication of equipment health comprising a thermographic image from the imaging sensor data using at least a portion of the application instructions;

deriving at least one dynamic indication of equipment health comprising ultrasonic leak detection from the dynamic sensor data using at least the dynamic signal analysis portion of the application instructions, wherein the at least one imagery indication of equipment health and the at least one dynamic indication of equipment health are derived from the imaging sensor data and the dynamic sensor data that were acquired at approximately the same time; and correlating the ultrasonic leak detection with the thermographic image to assess a system containing compressed or heated gas.

18. The method of claim 17 wherein the step of storing in an instrument application instructions for receiving, storing and analyzing focal plane array imaging sensor data comprises storing in an instrument application instructions for receiving, storing and analyzing focal plane array infrared imaging sensor data, and the step of receiving and storing focal plane array imaging sensor data in the instrument comprises receiving and storing focal plane array infrared imaging sensor data in the instrument.

19. The method of claim 17 wherein the step of storing in an instrument application instructions for receiving, storing and analyzing dynamic sensor data comprises storing in an instrument application instructions for receiving, storing and analyzing dynamic sensor data using FFT analysis, and the step of deriving at least one dynamic indication of equipment health comprises deriving at least one dynamic indication of equipment health using FFT analysis.

20. A method for inspecting equipment, the method comprising,
storing in a portable instrument (a) application instructions for receiving, storing and analyzing focal plane array imaging sensor data to derive at least one imagery indication of equipment health, (b) application instructions for receiving, storing, and analyzing dynamic sensor data to derive at least one dynamic indication of equipment health wherein the analyzing dynamic sensor data includes one or more analyzing techniques selected from the following group: Fast Fourier Transform (FFT) vibration analysis, waveform vibration analysis, spectral vibration analysis, stress wave analysis, transient analysis, sonic analysis, ultrasonic analysis, FFT flux analysis, and FFT current analysis, and (c) application instructions for correlating at least one imagery indication of equipment health with at least one dynamic indication of equipment health;

while on a route or survey, receiving and storing focal plane array imaging sensor data and dynamic sensor data at approximately the same time in the portable instrument using at least a portion of the application instructions;

deriving at least one imagery indication of equipment health comprising a relatively hot location on a thermogram from the imaging sensor data using at least a portion of the application instructions;

deriving at least one dynamic indication of equipment health comprising an ultrasonic signature from the dynamic sensor data using at least the dynamic signal analysis portion of the application instructions, wherein the at least one imagery indication of equipment health and the at least one dynamic indication of equipment health are derived from the imaging sensor data and the dynamic sensor data that were acquired at approximately the same time; and correlating the imagery indication of equipment health with the dynamic indication of equipment health to verify that the infrared indication of equipment health indicates heating caused by friction.

21. The method of claim 20 wherein the step of storing in an instrument application instructions for receiving, storing and analyzing focal plane array imaging sensor data comprises storing in an instrument application instructions for receiving, storing and analyzing focal plane array infrared imaging sensor data, and the step of receiving and storing focal plane array imaging sensor data in the instrument comprises receiving and storing focal plane array infrared imaging sensor data in the instrument.

22. The method of claim 20 wherein the step of storing in an instrument application instructions for receiving, storing and analyzing dynamic sensor data comprises storing in an instrument application instructions for receiving, storing and analyzing dynamic sensor data using FFT analysis, and the step of deriving at least one dynamic indication of equipment health comprises deriving at least one dynamic indication of equipment health using FFT analysis.

* * * * *